United States Patent
Yanagisawa

[19]

[11] Patent Number: 6,118,617
[45] Date of Patent: *Sep. 12, 2000

[54] MAGNETIC DISK DRIVE

[75] Inventor: Masahiro Yanagisawa, Tokyo, Japan

[73] Assignee: Takeuchi Industrial Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/785,384

[22] Filed: Jan. 21, 1997

[30] Foreign Application Priority Data

Jan. 26, 1996 [JP] Japan ..................... 8-011467

[51] Int. Cl.$^7$ ............... G11B 33/14; G11B 5/60
[52] U.S. Cl. ..................... 360/97.02; 360/234.1
[58] Field of Search ............. 360/97.02, 97.03, 360/97.04; 369/258, 275.5, 75.1

[56] References Cited

U.S. PATENT DOCUMENTS 5,381,284  1/1995  Gregory et al. ............... 360/97.02
5,631,787  5/1997  Huang et al. ............... 360/97.02

FOREIGN PATENT DOCUMENTS 61-9818  1/1986  Japan .
2-281496  11/1990  Japan ............... 360/97.02

Primary Examiner—George J. Letscher
Attorney, Agent, or Firm—Laff, Whitesel & Saret, Ltd.; J. Warren Whitesel

[57] ABSTRACT

A magnetic disk drive using a magnetic disk covered with a film of liquid lubricant for obviating wear ascribable to the friction and contact of the magnetic disk with a magnetic head is disclosed. The circumferential edge of the disk and the side wall of a casing are spaced from each other by 0.01 mm or less. In addition, the distance between the surface of the disk and a wall facing it, e.g., between the surfaces of adjacent disks or between the surface of each disk and the inner surface of a top wall or that of a bottom wall forming the casing is selected to be 3.00 mm or less.

10 Claims, 2 Drawing Sheets

MAGNETIC DISK DRIVE

BACKGROUND OF THE INVENTION

The present invention relates to a magnetic disk drive and, more particularly, to a magnetic disk drive of the type using a magnetic disk covered with a film of liquid lubricant for obviating wear ascribable to the friction and contact of the disk with a magnetic head.

A magnetic disk mounted on a magnetic disk drive as a recording medium has customarily been covered with a film of perfluoropolyether (PFPE) or similar liquid lubricant. The film of liquid lubricant protects the disk from wear ascribable to friction and contact of the disk with a magnetic head. It is a common practice to mount a stack of magnetic disks on a magnetic disk drive, as taught in, e.g., Japanese Patent Laid-Open Publication No. 61-9818. Such magnetic disks are mounted on a single spindle at a small spacing in order to increase the capacity of the disk drive.

The problem with the magnetic disks of the kind described is that the liquid lubricant is scattered around due to centrifugal force while the disks spin, reducing the thickness of the films. The decrease in the thickness of the films is accelerated by the shearing forces of air streams flowing on the surfaces of the disks. The decrease in the thickness of the films directly translates into the decrease in the lubricating effect expected to obviate the wear. As a result, the disks wear due to friction acting between them and magnetic heads and the contact of the former with the latter. This causes information stored in the disks to be lost.

SUMMARY OF THE INVENTION

It is therefore an object of the present invention to provide a magnetic disk drive capable of reducing air streams to flow on the surfaces of magnetic disks and causative of the scattering of a liquid lubricant, and having a highly reliable and high-density recording configuration.

In accordance with the present invention, in a magnetic disk drive using a magnetic disk covered with a film of liquid lubricant for obviating wear ascribable to friction and contact of the disk with a magnetic head, the inner surface of a side wall facing the circumferential edge of the disk and the circumferential edge are spaced from each other by 0.10 mm or less.

Also, in accordance with the present invention, a magnetic disk drive using a magnetic disk covered with a film of liquid lubricant for obviating wear ascribable to friction and contact of the disk with a magnetic head, disk drive includes a side wall facing the circumferential edge of the disk, and a wall facing the surface of the disk. The inner surface of the side wall and the circumferential edge of the disk are spaced from each other by 0.10 mm or less. The surface of the disk and the inner surface of the wall are spaced from each other by 3.00 mm or less.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
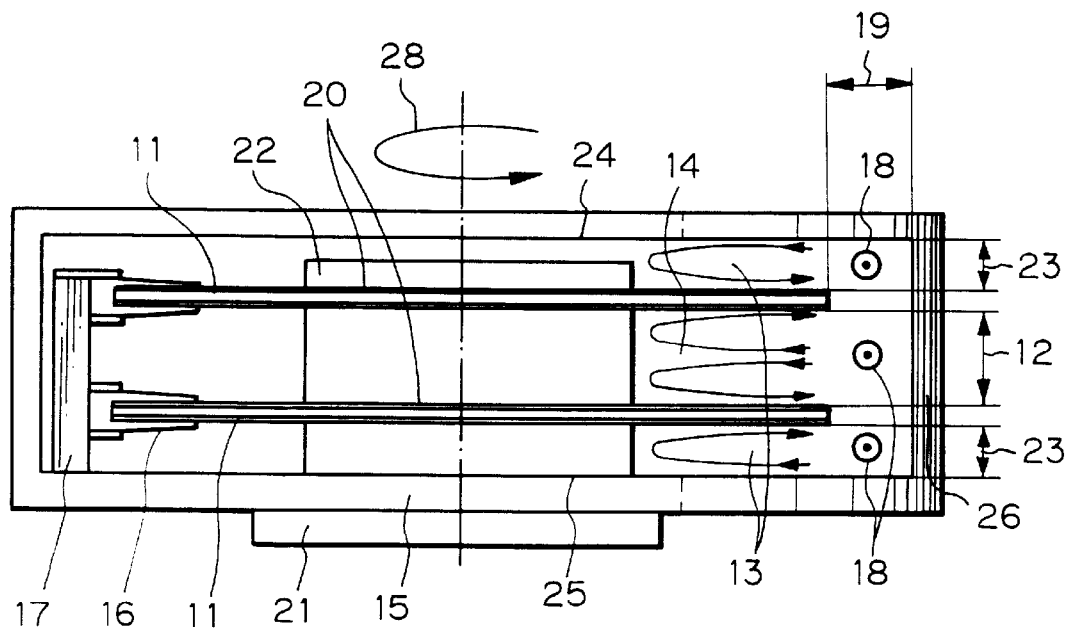
FIG. 1 is a vertical section showing a magnetic disk drive embodying the present invention.
Figure 2:
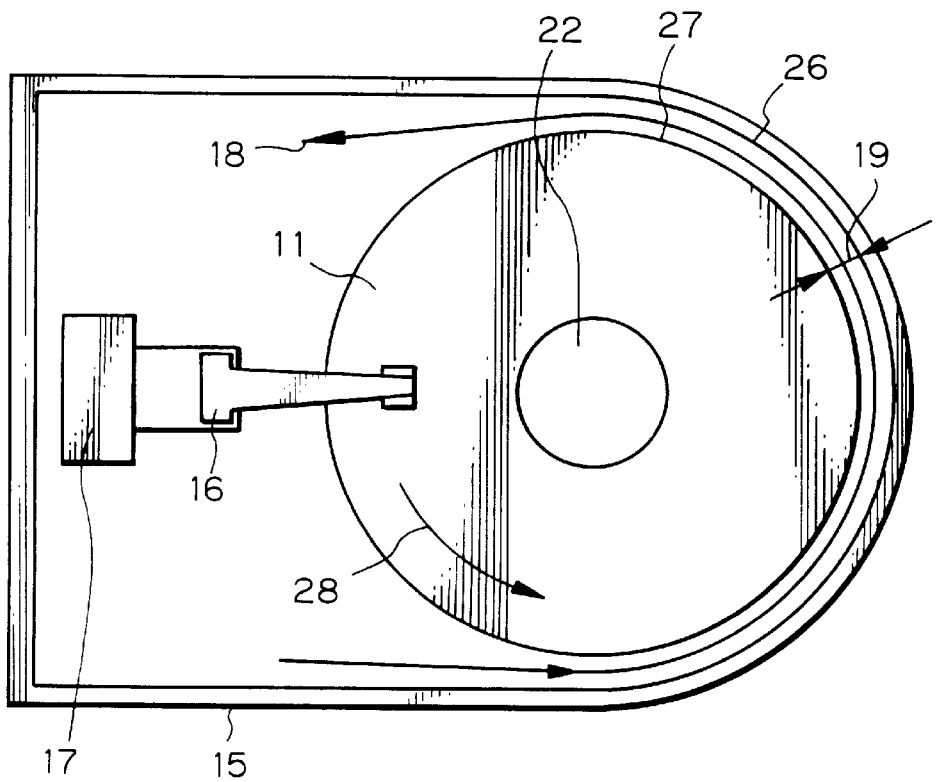
FIG. 2 is a horizontal section of the illustrative embodiment.

Referring to FIGS. 1 and 2, a magnetic disk drive embodying the present invention is shown and loaded with two magnetic disks 11 by way of example. Each disk 11 has its surfaces covered with a film of PFPE or similar liquid lubricant 20. The disks 11 are parallel to each other and spaced by a preselected distance 12. The disk drive includes a casing 15 accommodating the disks 11. A motor 21 is mounted on the outer periphery of the casing 15 in order to rotate a shaft or spindle 22 disposed in the casing 15. Magnetic heads 16 each faces the opposite major surfaces of one of the disks 11 so as to read data thereoutof. A head actuator 17 is constructed integrally with the heads 16.

The casing 15 is made up of a top wall or lid 24, a bottom wall or lid 25, and a side wall 26 connecting the top wall 24 and side wall 25. The top wall 24 faces one or upper disk 11 at a preselected distance 23 while the bottom wall 25 faces the other or lower disk 11 at the preselected distance 23. As shown in FIG. 2, the circumferential edge of each disk 11 faces the inner surface of the side wall 26 at a preselected distance 19 over substantially one half or outer half 27 thereof.

In the illustrative embodiment, the PFPE film 20 covering the surfaces of the each disk 11 is 3 nm thick. The disks 11 and the heads 16 mounted on the head actuator 17 constitute the disk drive.

For experiments, the distance 23 between the upper disk 11 and the inner surface of the top wall 24 or between the lower disk 11 and the inner surface of the bottom wall 25 was selected to be 1.00 mm, 2.00 mm or 3.00 mm. Also, the distance 12 between the disks 11 was selected to be 1.00 mm, 2.00 mm or 3.00 mm. Further, the distance 19 between the circumferential edge 27 of each disk 11 and the inner periphery of the side wall 26 was sequentially varied from 0.05 mm to 20.00 mm. Under these conditions, the motor 21 was energized to cause the spindle 22, i.e., disks 11 to spin in a direction 28 (counterclockwise in FIG. 2) at a rate of 5,400 rpm. On the elapse of 2,000 hours, the thickness of the lubricant films 20 was measured. In this case, a stream of air 18 flows counterclockwise, as viewed in FIG. 2, via the gap 19 between the edge 27 of each disk 11 and the inner surface of the side wall 26.

Figure 3:
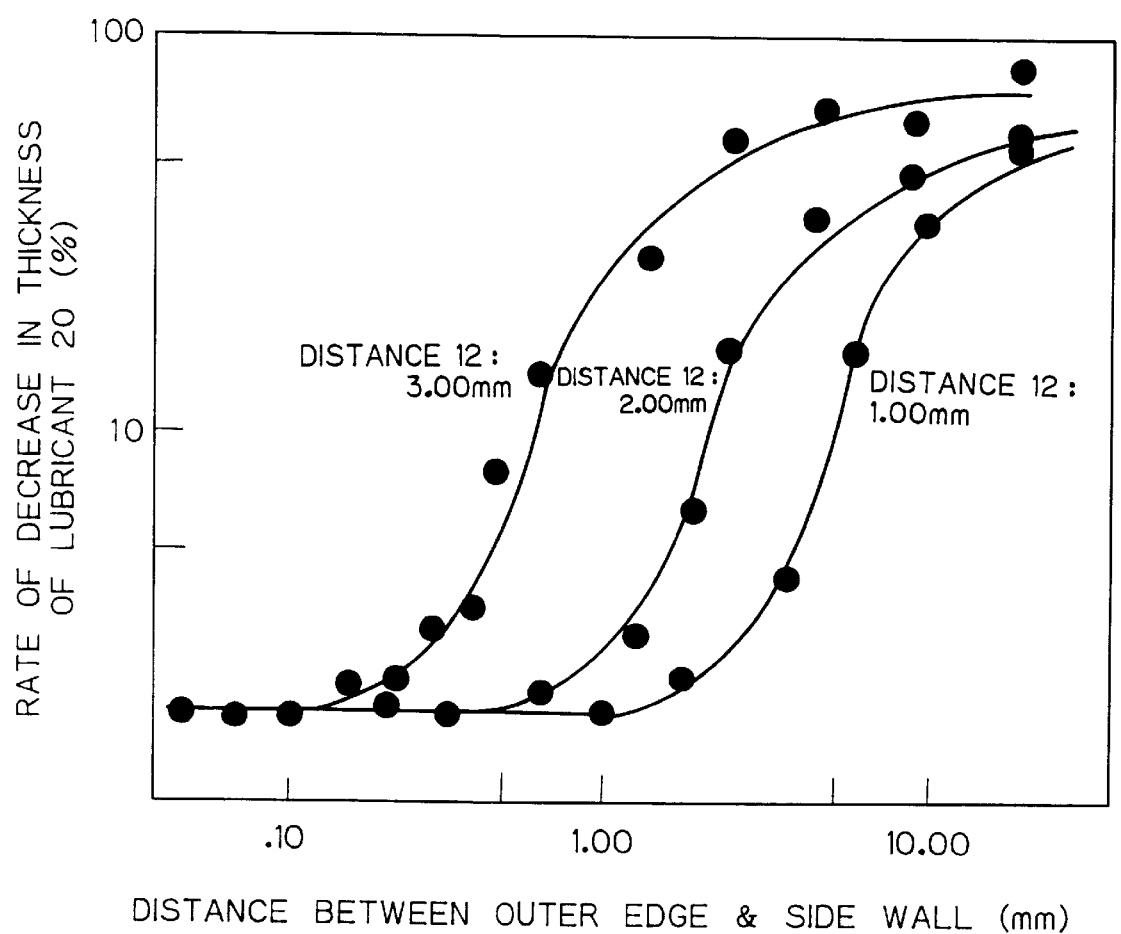
FIG. 3 is a graph showing a relating between the rate of decrease in the thickness of a liquid lubricant film and the distance between the outer edge of a magnetic disk and a side wall.

FIG. 3 plots the results of the above experiments. As FIG. 3 indicates, as the distance 19 between the edge 27 of each disk 11 and the side wall 26 decreases, the rate of decrease in the thickness of the lubricant film 20 decreases. The distance 19 allowing only the thickness of the lubricant 20 to decrease without being effected by the air stream 18 was found to be 1.00 mm, 0.50 mm or 0.10 mm when the distances 12 and 23 were 1.00 mm, 2.00 mm or 3.00 mm.

Assume that each disk 11 has a radius r, and that a stream of air 13 causes a shearing force $\tau_0$ to act on the lubricant film 20 in the radial direction at a part of the surface of the disk 11 corresponding to the radius r. Then, the shearing force $\tau_0$ is expressed as:

$$\tau 0 = (\omega^{3/2} \rho v^{1/2} r)/2 \qquad \text{Eq. (1)}$$

where $\omega$ denotes the angular velocity of the disk 11, $v$ denotes the kinematic viscosity of air, and $\rho$ denotes the density of air. Assume that a stream of air 14 flowing between the inner surface of the top wall 24 and that of the bottom wall 25 has a velocity V. Then, a shearing force $\tau$ ascribable to a stream of air is the gradient of the velocity V relative to a distance Z in the direction of rotation (distance between the disks 11). Therefore, assuming that the lubricant film 20 has a viscosity η, then the shearing force τ at a position represented by Z=0 (i.e. on the surface of the lubricant 20) corresponds to the shearing force To and is produced by:

$$\tau = \eta \delta v / \delta Z \qquad \text{Eq. (2)}$$

When the velocity V of the air stream 14 is positive (flowing toward the circumferential edge of the disk 11), the shearing force τ causes the lubricant 20 to be scattered around. When the velocity V is zero, the shearing force $\tau_0$ is also zero and minimizes the scattering of the lubricant 20.

Air flows radially outward in the gap between each disk 11 and the wall facing it, e.g., between the disk 11 and the inner surface of the top wall 24 or that of the bottom wall 25 or at the edge 27 and surface of the disk 11. On the other hand, air flows radially inward at the intermediate between the disks 11 or at the inner surface of the top wall 24 or that of the bottom wall 25. Further, the previously stated air stream 18 occurs in the direction of rotation of the disks 11.

The velocity distribution of air stream depends on the Reynolds' number R. Let the distance 12 between the disks 11 and the distance 19 and 23 be represented by d each. Then, the distance is expressed as:

$$R = \omega d^2 / v \qquad \text{Eq. (3)}$$

Assuming that the angular velocity ω and kinematic viscosity v are constant, then the velocity V sequentially approaches zero as the Reynolds' number R, i.e., distance d decreases, as shown in FIG. 3. This effect is multiplied as the distances 12 and 23 decrease.

In summary, it will be seen that the present invention provides a magnetic disk drive capable of minimizing the decrease in the thickness of a liquid lubricant film covering a magnetic disk and ascribable to the rotation of the disk. For this purpose, in the disk drive, the circumferential edge of the disk and the side wall of a casing are spaced from each other by 0.01 mm or less. In addition, the distance between the surface of the disk and a wall facing it, e.g., between the surfaces of adjacent disks or between the surface of each disk and the inner surface of a top wall or that of a bottom wall forming the casing is selected to be 3.00 mm or less.

Various modifications will become possible for those skilled in the art after receiving the teachings of the present disclosure without departing from the scope thereof.

What is claimed is:

1. In a magnetic disk drive using a magnetic disk covered with a film of liquid lubricant for obviating wear ascribable to friction and contact of said magnetic disk with a magnetic head, an inner surface of a side wall facing a circumferential edge of said magnetic disk and said circumferential edge are spaced from each other by 0.10 mm or less wherein said film of liquid decreases in thickness as a function of the spacing between said side wall and said circumferential edge of said magnetic disk defined by a sharply increasing threshold value when a ratio of a decrease of thickness of the lubricant at which the air flow can be neglected is at least 1.8%.

2. A magnetic disk drive as claimed in claim 1 wherein said film of liquid lubricant decreases in thickness responsive to a flow of the liquid lubricant with negligible shearing ascribed to air flow and as a function of the space between said edge of said magnetic disk and the side wall.

3. A magnetic disk drive as claimed in claim 1 wherein a surface of said disk is separated from other neighboring surfaces by a distance of no more than 3 mm, said film of liquid lubricant decreases in thickness as a function of the space between said edge of said magnetic disk and the side wall with a characteristic, wherein the decrease is about:

1.00 mm when the space is 1.00 mm;
0.50 mm when the space is 2.00 mm;
0.10 mm when the space is 3.00 mm.

4. A magnetic disk drive using a magnetic disk covered with a film of liquid lubricant for obviating wear ascribable to friction and contact of said magnetic disk with a magnetic disk, said magnetic disk drive comrpsing:

a side wall facing a circumferential edge of said magnetic disk; and a wall facing a surface of said magnetic disk;

wherein an inner surface of said side wall and said circumferential edge of said magnetic disk are spaced from each other by 0.10 mm or less, wherein said surface of said magnetic disk and an inner surface of said wall are spaced from each other by 3.00 mm or less, and wherein said film of liquid lubricant decreases in thickness as a function of the spacing between said side wall and said circumferential edge of said magnetic disk defined by a sharply increasing threshold value when a ratio of a decrease of thickness of the lubricant at which the air flow can be neglected is at least 1.8%.

5. A magnetic disk drive as claimed in claim 4, wherein said magnetic disk is mounted on a casing including said side wall and said wall and is spaced from adjacent magnetic disks by a preselected distance.

6. A magnetic disk drive as claimed in claim 5 wherein said film of liquid lubricant decreases in thickness responsive to a flow of the liquid lubricant with negligible shearing ascribed to air flow and as a function of the space between said edge of said magnetic disk and the side wall.

7. A magnetic disk drive as claimed in claim 5 wherein a surface of said disk is separated from other neighboring surfaces by a distance of no more than 3 mm, said film of liquid lubricant decreases in thickness as a function of the space between said edge of said magnetic disk and the side wall with a characteristic, wherein the decrease is about:

1.00 mm when the space is 1.00 mm;
0.50 mm when the space is 2.00 mm;
0.10 mm when the space is 3.00 mm.

8. In a magnetic disk drive using a magnetic disk covered with a film of liquid lubricant for obviating wear ascribable to friction and contact of said magnetic disk with a magnetic head, an inner surface of a side wall facing a circumferential edge of said magnetic disk and said circumferential edge are spaced from each other by 0.10 mm or less; wherein said disk is rotated at a speed which can scatter said liquid lubricant responsive to shearing forces τo generated by said rotation, wherein said film of liquid lubricant has a thickness decreasing in thickness as a function of a distance between said outer edge of the magnetic disk and the side wall, and minimizing said scattering by limiting said shearing forces expressed as $\tau 0 = (\omega^{3/2} \rho v^{1/2} r)/2$ where: τo=shearing force; ω=angular velocity; v=kinematic viscosity of air; ρ=density of air; said shear force to being limited by reducing a Reynolds number described as $R = \omega d^{2/v}$ by reducing d which is the distance between a circumference of the disk and said side wall to no more than 1 mm defined by a threshold value sharply increasing when a ratio of decrease of the lubricant exceeds 1.8%.

9. A magnetic disk drive comprising a magnetic disk covered with a film of liquid lubricant for obviating wear ascribable to friction and contact of said magnetic disk with a magnetic head, said magnetic disk drive comprising:

a side wall facing a circumferential edge of said magnetic disk;

a wall facing a surface of said magnetic disk;

wherein an inner surface of said side wall and said circumferential edge of said magnetic disk are spaced from each other by 0.10 mm or less, and wherein said surface of said magnetic disk and an inner surface of said wall are spaced from each other by 3.00 mm or less;

wherein said magnetic disk is mounted on a casing including said side wall and said wall and is spaced from adjacent magnetic disks by a preselected distance; and wherein said disk is rotated at a speed which can scatter said liquid lubricant responsive to shearing forces $\tau$ generated by said rotation, wherein said film of liquid lubricant has a thickness decreasing in thickness as a function of a distance between said outer edge of the magnetic disk and the side wall, and minimizing said scattering by limiting said shearing forces $\tau o$ expressed as $\tau 0=(\omega^{3/2}\rho v^{1/2}r)/2$ where: $\tau o$=shearing force; $\omega$=angular velocity; $v$=kinematic viscosity of air; $\rho$=density of air; said shear force $\tau o$ being limited by reducing a Reynolds number described as $R=\omega d^{2/v}$ by reducing d which is the distance between a circumference of the disk and said side wall to no more than 1 mm defined by a threshold value sharply increasing when a ratio of decrease of the lubricant exceeds 1.8%.

10. A magnetic disk drive using a magnetic disk covered with a film of liquid lubricant for obviating wear ascribable to friction and a contact of said magnetic disk with a magnetic head, said magnetic disk drive comprising:

a side wall facing a circumferential edge of said magnetic disk; and a wall facing a surface of said magnetic disk;

wherein an inner surface of said side wall and said circumferential edge of said magnetic disk are spaced from each other by a first distance and wherein said surface of said magnetic disk and an inner surface of said wall are spaced from each other a second distance, and wherein said film of liquid lubricant decreases in thickness as a function of the first distance between said circumferential edge of said magnetic disk and said side wall defined by a threshold value sharply increasing when a ratio of decrease of thickness of the lubricant at which the air flow can be neglected is at least 1.8%.

* * * * *